(12) United States Patent
Steffey et al.

(10) Patent No.: US 9,074,878 B2
(45) Date of Patent: Jul. 7, 2015

(54) LASER SCANNER

(71) Applicant: FARO Technologies, Inc., Lake Mary, FL (US)

(72) Inventors: Kenneth Steffey, Longwood, FL (US); Reinhard Becker, Ludwigsburg (DE); Bernd-Dietmar Becker, Ludwigsburg (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 56 days.

(21) Appl. No.: 14/019,081

(22) Filed: Sep. 5, 2013

(65) Prior Publication Data
US 2014/0063489 A1  Mar. 6, 2014

Related U.S. Application Data

(60) Provisional application No. 61/697,619, filed on Sep. 6, 2012.

(51) Int. Cl.
  *G01N 21/00* (2006.01)
  *G01B 11/24* (2006.01)
  *G01C 15/00* (2006.01)
  (Continued)

(52) U.S. Cl.
  CPC .............. *G01B 11/24* (2013.01); *G01C 15/002* (2013.01); *G01S 17/89* (2013.01); *G01S 17/023* (2013.01); *G01S 17/42* (2013.01); *G01S 7/4817* (2013.01)

(58) Field of Classification Search
  CPC .... G01B 11/24; G01C 15/002; G01S 17/023; G01S 17/42; G01S 17/89; G01S 7/4817
  See application file for complete search history.

(56) References Cited

U.S. PATENT DOCUMENTS

| | | | |
|---|---|---|---|
| 3,830,567 | A | 8/1974 | Riegl |
| 3,899,145 | A | 8/1975 | Stephenson |

(Continued)

FOREIGN PATENT DOCUMENTS

| | | |
|---|---|---|
| AU | 2005200937 A1 | 9/2006 |
| DE | 2216765 A1 | 4/1972 |

(Continued)

OTHER PUBLICATIONS

Combined International Search and Examination Report for application GB1302639.8 dated May 29, 2014.

(Continued)

*Primary Examiner* — Kara E Geisel
*Assistant Examiner* — Dominic J Bologna
(74) *Attorney, Agent, or Firm* — Cantor Colburn LLP

(57) ABSTRACT

A laser scanner for optically scanning and measuring an environment is provided. The laser scanner includes a light transmitter for emitting a light beam to measure a plurality of points in the environment, the light transmitter coupled to the rotating unit. A receiver is provided for receiving a reflected light beam reflected from the plurality of measurement points, the receiver being coupled to the rotating unit. A first image acquisition unit is configured to record a visible image of an area of the environment that includes the plurality of points. A sensing device is configured to record data of the area. A processor is operably coupled to the receiver, the first image acquisition unit and the sensing device, the processor is configured to associate a color value from the visible image and a recorded data value from the sensing device with each of the plurality of points.

19 Claims, 13 Drawing Sheets

(51) Int. Cl.
*G01S 17/89* (2006.01)
*G01S 17/02* (2006.01)
*G01S 17/42* (2006.01)
*G01S 7/481* (2006.01)

(56) References Cited

U.S. PATENT DOCUMENTS

| | | | |
|---|---|---|---|
| 3,945,729 | A | 3/1976 | Rosen |
| 5,181,234 | A | 1/1993 | Smith |
| 5,218,427 | A | 6/1993 | Koch |
| 5,313,261 | A | 5/1994 | Leatham et al. |
| 5,329,347 | A | 7/1994 | Wallace et al. |
| 5,329,467 | A | 7/1994 | Nagamune et al. |
| 5,517,297 | A | 5/1996 | Stenton |
| 5,933,267 | A | 8/1999 | Ishizuka |
| 5,940,181 | A | 8/1999 | Tsubono et al. |
| 5,988,862 | A | 11/1999 | Kacyra et al. |
| 6,040,898 | A | 3/2000 | Mrosik et al. |
| 6,069,700 | A | 5/2000 | Rudnick et al. |
| 6,362,872 | B1 | 3/2002 | Berdanier |
| 6,504,602 | B1 | 1/2003 | Hinderling |
| 6,512,575 | B1 | 1/2003 | Marchi |
| 6,512,993 | B2 | 1/2003 | Kacyra et al. |
| 6,587,246 | B1 | 7/2003 | Anderton et al. |
| 6,675,122 | B1 | 1/2004 | Markendorf et al. |
| 6,710,859 | B2 | 3/2004 | Shirai et al. |
| 6,852,975 | B2 | 2/2005 | Riegl et al. |
| 6,856,381 | B2 | 2/2005 | Christoph |
| 6,917,415 | B2 | 7/2005 | Gogolla et al. |
| 7,076,420 | B1 | 7/2006 | Snyder et al. |
| 7,127,822 | B2 | 10/2006 | Kumagai et al. |
| 7,193,690 | B2 | 3/2007 | Ossig et al. |
| 7,197,179 | B2 | 3/2007 | Rubbert et al. |
| 7,285,793 | B2 | 10/2007 | Husted |
| 7,430,068 | B2 | 9/2008 | Becker et al. |
| 7,733,544 | B2 | 6/2010 | Becker et al. |
| 7,847,922 | B2 | 12/2010 | Gittinger et al. |
| 7,869,005 | B2 | 1/2011 | Ossig et al. |
| 7,889,113 | B2 | 2/2011 | Cardiasmenos et al. |
| 8,063,368 | B1* | 11/2011 | Youngs et al. ............... 250/334 |
| 8,064,046 | B2 | 11/2011 | Ossig et al. |
| 8,072,663 | B2 | 12/2011 | O'Neill et al. |
| 8,368,875 | B2 | 2/2013 | Kludas et al. |
| 8,478,480 | B2 | 7/2013 | Mian et al. |
| 2002/0059042 | A1 | 5/2002 | Kacyra et al. |
| 2002/0143506 | A1 | 10/2002 | D'Aligny et al. |
| 2002/0149694 | A1 | 10/2002 | Seo |
| 2003/0043386 | A1 | 3/2003 | Froehlich et al. |
| 2003/0137449 | A1 | 7/2003 | Vashisth et al. |
| 2003/0179361 | A1 | 9/2003 | Ohtomo et al. |
| 2004/0004727 | A1 | 1/2004 | Yanagisawa et al. |
| 2004/0027554 | A1 | 2/2004 | Ishinabe et al. |
| 2004/0119833 | A1 | 6/2004 | Duncan et al. |
| 2004/0221790 | A1 | 11/2004 | Sinclair et al. |
| 2004/0246462 | A1 | 12/2004 | Kaneko et al. |
| 2005/0046823 | A1 | 3/2005 | Ando et al. |
| 2005/0111514 | A1 | 5/2005 | Matsumoto et al. |
| 2005/0141052 | A1 | 6/2005 | Becker et al. |
| 2005/0190384 | A1 | 9/2005 | Persi et al. |
| 2006/0022140 | A1 | 2/2006 | Connelly et al. |
| 2006/0061566 | A1 | 3/2006 | Verma et al. |
| 2006/0109536 | A1 | 5/2006 | Mettenleiter et al. |
| 2006/0245717 | A1 | 11/2006 | Ossig et al. |
| 2007/0150111 | A1 | 6/2007 | Wu et al. |
| 2007/0171394 | A1 | 7/2007 | Steiner et al. |
| 2007/0229929 | A1 | 10/2007 | Soreide et al. |
| 2007/0256311 | A1 | 11/2007 | Ferrari |
| 2008/0112029 | A1* | 5/2008 | Bodkin ............... 359/233 |
| 2008/0136626 | A1 | 6/2008 | Hudson et al. |
| 2008/0273758 | A1 | 11/2008 | Fuchs et al. |
| 2008/0309546 | A1 | 12/2008 | Wakayama et al. |
| 2008/0309665 | A1 | 12/2008 | Gregory, II et al. |
| 2009/0133494 | A1 | 5/2009 | Van Dam et al. |
| 2009/0187373 | A1 | 7/2009 | Atwell et al. |
| 2009/0251680 | A1 | 10/2009 | Farsaie |
| 2010/0134596 | A1 | 6/2010 | Becker |
| 2010/0149407 | A1 | 6/2010 | Lee et al. |
| 2010/0195086 | A1 | 8/2010 | Ossig et al. |
| 2011/0084868 | A1* | 4/2011 | Daly et al. ............... 342/22 |
| 2011/0113170 | A1 | 5/2011 | Ossig et al. |
| 2012/0019806 | A1 | 1/2012 | Becker et al. |
| 2012/0033069 | A1 | 2/2012 | Becker et al. |
| 2012/0069325 | A1 | 3/2012 | Schumann et al. |
| 2012/0069352 | A1 | 3/2012 | Ossig et al. |
| 2012/0070077 | A1 | 3/2012 | Ossig et al. |
| 2012/0133953 | A1 | 5/2012 | Ossig et al. |
| 2012/0287265 | A1 | 11/2012 | Schumann et al. |
| 2012/0320193 | A1 | 12/2012 | Lienhart et al. |
| 2013/0121529 | A1 | 5/2013 | Fleisher et al. |
| 2013/0278759 | A1 | 10/2013 | Zimmermann et al. |

FOREIGN PATENT DOCUMENTS

| | | |
|---|---|---|
| DE | 3227980 A1 | 5/1983 |
| DE | 3340317 A1 | 8/1984 |
| DE | 4027990 C1 | 2/1992 |
| DE | 4222642 A1 | 1/1994 |
| DE | 4340756 A1 | 6/1994 |
| DE | 4303804 A1 | 8/1994 |
| DE | 19601875 A1 | 7/1997 |
| DE | 19607345 A1 | 8/1997 |
| DE | 19811550 A1 | 9/1999 |
| DE | 19850118 A1 | 5/2000 |
| DE | 19928958 A1 | 11/2000 |
| DE | 20208077 U1 | 5/2002 |
| DE | 10336458 A1 | 2/2004 |
| DE | 20320216 U1 | 4/2004 |
| DE | 10304188 A1 | 8/2004 |
| DE | 10361870 A | 7/2005 |
| DE | 102004028090 A1 | 12/2005 |
| DE | 202006005643 U1 | 8/2006 |
| DE | 102005056265 A1 | 5/2007 |
| DE | 102006053611 A1 | 5/2007 |
| DE | 102008014274 A1 | 8/2009 |
| DE | 202013006886 U1 | 11/2013 |
| EP | 0949524 A1 | 10/1999 |
| EP | 1310764 A2 | 5/2003 |
| EP | 1342989 A2 | 9/2003 |
| EP | 1347267 A1 | 9/2003 |
| EP | 1528410 A1 | 5/2005 |
| GB | 2336493 A | 10/1999 |
| GB | 2447258 A | 9/2008 |
| JP | 2003156330 | 5/2003 |
| JP | 2004109106 A | 4/2004 |
| WO | 8905512 | 6/1989 |
| WO | 9711399 | 3/1997 |
| WO | 0020880 A2 | 4/2000 |
| WO | 0063681 | 10/2000 |
| WO | 2004068211 | 8/2004 |
| WO | 2005008271 A2 | 1/2005 |
| WO | 2005059473 A2 | 6/2005 |
| WO | 2007012198 A1 | 2/2007 |
| WO | 2007118478 | 10/2007 |
| WO | 2008068791 A1 | 6/2008 |
| WO | 2008122935 | 10/2008 |
| WO | 2009053085 A1 | 4/2009 |
| WO | 2010108643 | 9/2010 |
| WO | 2011010225 | 1/2011 |
| WO | 2011010226 | 1/2011 |
| WO | 2011021103 | 2/2011 |
| WO | 2011060898 | 5/2011 |
| WO | 2011060899 | 5/2011 |
| WO | 2011060900 | 5/2011 |
| WO | 2011127375 | 10/2011 |
| WO | 2011141100 | 11/2011 |
| WO | 2011141547 A1 | 11/2011 |
| WO | 2012013277 | 2/2012 |
| WO | 2012013278 | 2/2012 |

(56) References Cited

FOREIGN PATENT DOCUMENTS

| WO | 2012013279 | 2/2012 |
|---|---|---|
| WO | 2012013280 | 2/2012 |

OTHER PUBLICATIONS

WO 00/26612 is the published equivalent of DE 19850118. Published May 11, 2000.
Akca, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656666.
Bornaz, L., et al., Multiple Scan Registration in Lidar Close-Range Applications, the International Archives of the Photogrammetry, Remote Sensing and Spatial Information Sciences, vol. XXXIV, Part 5/W12, Jul. 2003, pp. 72-77, XP002590306.
Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Conference on Intelligent Robots and Systems], New York, NY: IEEE, US, vol. 1, Oct. 27, 2003; pp. 188-193, XP010672337, DOI:10.1109/IROS.2003.1250626; ISBN: 978-0-7803-7860-5, p. 189; Figure 1.
Chinese Office Action Dated Jun. 2, 2010 with English Translation of the Text for Application No. 2006800540959.
Chinese Publication No. CN 1445509, published Oct. 1, 2003—English Abstract Not Available; EP Equivalent 1347267.
DRS Technologies; Tamarisk 320; "A Whole New Dimension in Thermal Imaging Performance"; DRS RSTA, Inc. 2011.
Electro Optics Jun. 2012; Business News "Headwall Photonics Hyperspec Slected by US Navy".
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998, Nov. 3, 1998 pp. 343-354, XP 002587995, Proceedings of the SPIE.
FLIR; "12 Things to Consider Before Buying an Infrared Camera; A Guide for Investing in Infrared".
Godin, G., et al., A Method for the Registration of Attributed Range Images, Copyright 2001, [Retrieved on Jan. 18, 2010 at 03:29 from IEEE Xplore].
International Preliminary Report on Patentability and Written Opinion for Application No. PCT/EP2004/014605; Date of Issue Aug. 29, 2006.
International Preliminary Report and Written Opinion for International Application No. PCT/EP2007/005789 mailed Jan. 6, 2009.
International Preliminary Report on Patentability and Written Opinion for Application No. PCT/EP2009/050887; Date of Issue Sep. 7, 2010.
International Preliminary Report on Patentability and Written Opinion for PCT/EP2009/050888; Date of Issuance Sep. 7, 2010.
International Preliminary Report on Patentability and Written Opinion for PCT/IB2010/002216; Date of Issuance Jan. 24, 2012.
International Preliminary Report on Patentability and Written Opinion for International Patent Application PCT/IB2010/002226; Date of Issuance Jan. 24, 2012.
iQsun Laserscanner Brochure, 2 Pages, Apr. 2005.
International Search Report for International Patent Application PCT/EP2004/014605; mailing date Apr. 15, 2005.
International Search Report for International Application No. PCT/EP2006/003010 mailed Nov. 12, 2006.
International Search Report for International Application No. PCT/EP2007/005789 mailed Oct. 30, 2007.
International Search Report for PCT/EP2009/009174 and Written Opinion of the International Searching Authority; mailing date May 25, 2010.
International Search Report of the International Searching Authority for PCT/EP2009/050887; Date of Mailing May 14, 2009.
International Search Report of the International Searching Authority for PCT/EP2009/050888; Date of Mailing Sep. 15, 2009.
International Search Report for International Patent Application PCT/EP2010/001779; mailing date Jul. 20, 2010.
International Search Report for International Patent Application PCT/EP2010/001780; mailing date Jul. 23, 2010.
International Search Report for International Patent Application PCT/EP2010/001781; mailing date Jul. 22, 2010.
International Search Report of the International Searching Authority for PCT/EP2010/006866; Date of Mailing Mar. 14, 2011.
International Search Report for International Patent Application PCT/EP2010/006867; mailing date Mar. 18, 2011.
International Search Report of the International Searching Authority for PCT/EP2010/006868; Date of Mailing Mar. 14, 2011.
International Search Report of the International Searching Authority for PCT/IB2010/002216; date of mailing Feb. 3, 2011.
International Search Report and Written Opinion for International Patent Application PCT/IB2010/002226; mailing date Dec. 13, 2010.
International Search Report for PCT/IB2010/002258. Date of Mailing Jan. 28, 2011.
http://www.omega.com/techref/iredtempmeasur.html; "Infrared Temperature Measurement Theory and Application".
Melexis; MLX90620; Datasheet IR 16x4; Mar. 20, 2012; 3001090620; Rev 2.0.
Masaru Sato and Koji Mizuno (2010). Millimeter-Wave Imaging Sensor, Microwave and Millimeter Wave Technologies from Photonic Bandgap Devices to Antenna and Applications, Igor Minin (Ed.), ISBN: 978-953-7619-66-4, InTech, Available from: http://www.intechopen.com/books/microwave-and-millimeter-wavetechnologies-from-photonic-bandgap-devices-to-antenna-and-applications/millimeter-wave-imaging-sensor.
Jasiobedzki, Piotr, "Laser Eye—A New 3D Sensor for Active Vision", SPIE-Sensor Fusion VI, vol. 2059, Sep. 7, 1993, pp. 316-321, XP00262856, Boston, U.S.A., Retrieved from the Internet: URL:http://.scitation.aip.org/getpdf/servlet/GetPDFServlet?filetype=pdf&id=PSISDG002059000001000316000001&idtype=cvips&doi=10.117/12.150236&prog=nomral>[retrieved on Mar. 8, 2011] the whole document.
Dorit Borrmann, Jan Elseberg, and Andreas Nuchter. Thermal 3D Mapping of Building Façades. In Proceedings of the 8th Conference on Intelligent Autonomous Systems (IAS '12), Jeju Island, Korea, 2012 (10 pages).
Top Con "IS Imaging Station; Imaging Robotic Total Station" (4 pages) Topcon Europe Positioning B.V. (Jun. 2008).
Umeda, K., et al., Registration of Range and Color Images Using Gradient Constraints and Ran Intensity Images, Proceedings of the 17th International Conference onPatern Recognition (ICPR'04), Copyright 2010 IEEE. [Retrieved online Jan. 28, 2010—IEEE Xplore].
Valerie C. Coffey; Multispectral Imaging Moves into the Mainstream; 18/OPN Optics & Photonics News.
Written Opinion of the International Searching Authority for International Patent Application PCT/EP2010/006867; mailing date Mar. 18, 2011.
Williams, J.A., et al., Evaluation of a Novel Multiple Point Set Registration Algorithm, Copyright 2000, [Retrieved on Jan. 18, 2010 at 04:10 from IEEE Xplore].
XANSYS Forum Index; "Mapping temperature data from IR image"; between xu.jing and Martin Liddle.
L. Mihailescu, et al "Standoff 3D Gamma-Ray Imaging" Apr. 2009; vol. 56, No. 2 IEEE Transactions on Nuclear Science (pp. 479-486).
International Search report for the International Searching Authority dated Nov. 25, 2013 for International Application No. PCT US2013/058166 filed Sep. 5, 2013 (5 pages).
Written Opinion for the International Searching Authority dated Nov. 25, 2013 for International Application No. PCT US 2013/058166 filed Sep. 5, 2013 (5 pages).
gom—Optical Measuring Techniques website http://www.gom.com/3d-software/atos-professional.html; extracted Sep. 13, 2012.
PolyWorks v12 IM Align Reference Guide: 3D Image Alignment Software Version 12.0 for Windows; 10.5 Smoothing 3D Images; reference p. 169 (277 pages). InnovMetric Software Inc.
Steinbichler T-Scan 3—3D Digitizing; 7 Pages; Steinbichler Optotechnik GmbH; www.steinbichler.com.

* cited by examiner

LASER SCANNER

CROSS REFERENCE TO RELATED APPLICATIONS

The present application claims the benefit of U.S. Provisional Application No. 61/697,619 filed Sep. 6, 2012, the entire contents of which is hereby incorporated herein by reference.

BACKGROUND OF THE INVENTION

The subject matter disclosed herein relates to a laser scanner and in particular to a laser scanner able to acquire and display multiple parameters related to a scanned object.

Laser scanners are a type of device that utilize a light source to measure and determine the three-dimensional coordinates of points on the surface of an object. Laser scanners are typically used for scanning closed or open spaces such as interior areas of buildings, industrial installations and tunnels. Laser scanners are used for many purposes, including industrial applications and accident reconstruction applications. A laser scanner can be used to optically scan and measure objects in a volume around the scanner through the acquisition of data points representing objects within the volume. Such data points are obtained by transmitting a beam of light onto the objects and collecting the reflected or scattered light to determine the distance, two-angles (i.e. an azimuth and a zenith angle), and optionally a gray-scale value. This raw scan data is collected, stored and sent to a processor or processors to generate a three-dimensional image representing the scanned area or object. In order to generate the image, at least three values are collected for each data point. These three values may include the distance and two angles, or may be transformed values, such as the x, y, z coordinates.

Some contemporary laser scanners also include a camera mounted on or integrated into the laser scanner for gathering camera digital images of the environment and for presenting the camera digital images to an operator. By viewing the camera images, the operator can determine the extent of the measured volume and adjust the settings of the laser scanner to measure over a larger or smaller region of space. In addition, the camera digital images may be transmitted to a processor to add color to the scanner image. In order to generate a color scanner image, at least six values (three-positional values such as x, y, z; and color values, such as red, green and blue values or "RGB") are collected for each data point.

Accordingly, while existing laser scanners are suitable for their intended purposes, what is needed is a laser scanner that has certain features of embodiments of the present invention.

BRIEF DESCRIPTION OF THE INVENTION

According to one aspect of the invention, a laser scanner for optically scanning and measuring an environment is provided. The laser scanner includes a light transmitter for emitting a transmitter light beam to measure a plurality of measurement points in the environment, the light transmitter coupled to a rotating unit. A receiver is provided for receiving a reflected light beams reflected from the plurality of measurement points, the receiver being coupled to the rotating unit. A first image acquisition unit is configured to record a visible image of an area of the environment that includes the plurality of measurement points. A sensing device is configured to record a second image of a collected data of the area. A user interface is provided. A processor is operably coupled to the receiver, the first image acquisition unit, the second image acquisition unit and the user interface, the processor being responsive to executable computer instructions when executed on the processor for associating a color value from the visible image and a collected data value from the second image with each of the plurality of measurement points.

According to another aspect of the invention, a method of viewing three dimensional data using a laser scanner is provided. The method includes acquiring data points of an area with the laser scanner. A visual image is acquired of the area. A data image of the area is collected. An image is displayed of the data points on a display. A first portion is selected of a displayed image of data points and displaying a portion of visual image corresponding to the first portion. A second portion is selected of the displayed image of data points and displaying a portion of the collected data image corresponding to the second portion.

According to yet another aspect of the invention, a device is provided. The device includes a laser scanner having a center and a processor, wherein the laser scanner is configured to make a scan by optically scanning and measuring an environment by light beams, wherein the processor is configured to determine three dimensional coordinates of a plurality of points in the environment. A first sensor is electrically coupled to the processor, the first sensor being configured to acquire a first image in a visual spectrum. A second sensor is electrically coupled to the processor, the second sensor being configured to acquire a second image of collected data. A user interface is coupled to the laser scanner. Wherein the processor is configured to correct any deviations of a center and orientation of the first sensor and the second sensor to link the first image and the second image to the plurality of points.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 8A, is an illustration of the user interface screen of FIG. 6 with a visual image overlay and a parameter image overlay in accordance with an embodiment of the invention;

Figure 1:
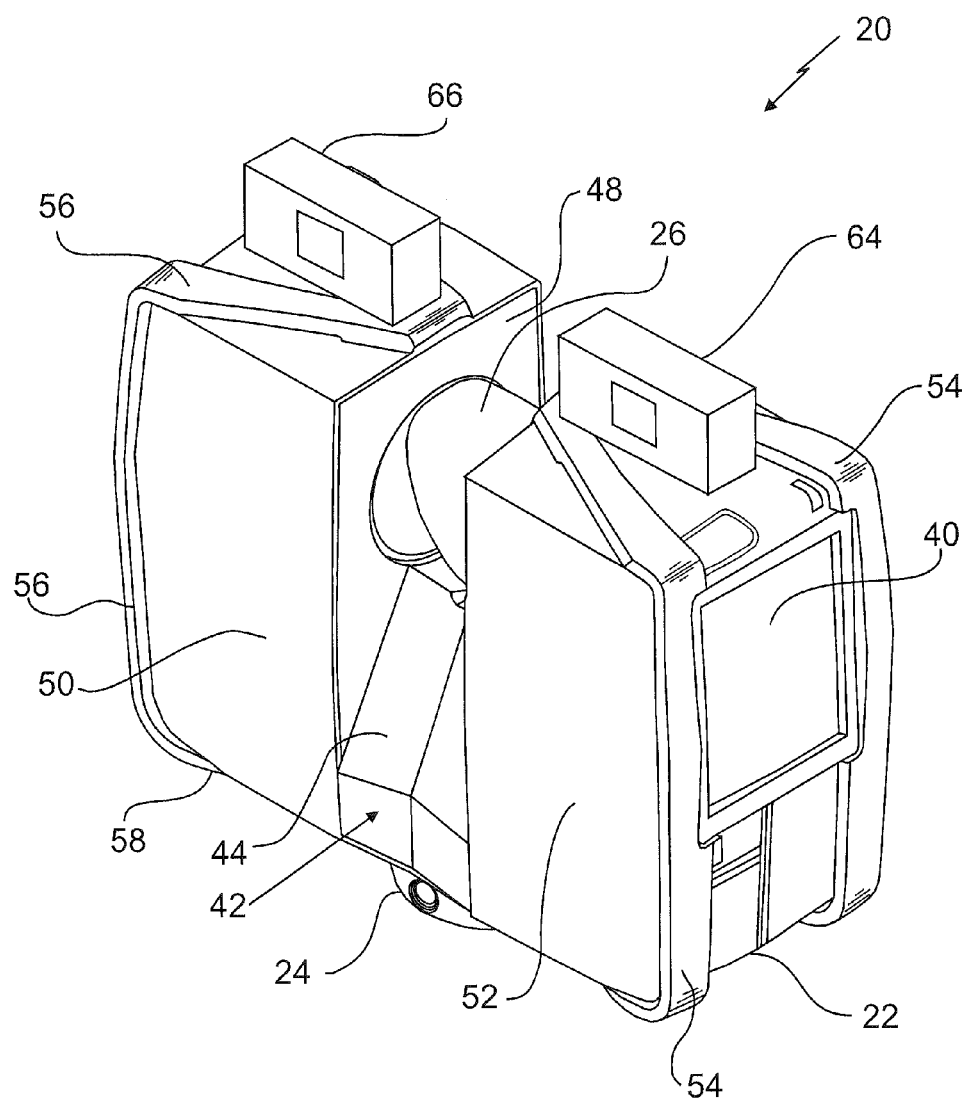
FIG. 1 is a perspective view of a laser scanner in accordance with an embodiment of the invention.

The detailed description explains embodiments of the invention, together with advantages and features, by way of example with reference to the drawings.

DETAILED DESCRIPTION OF THE INVENTION

Embodiments of the present invention provide for a laser scanner device that may acquire sensed emissions and photographic images related to the scanned volume. The scan data, sensed emissions, and photographic image may be simultaneously displayed on a graphical display to enhance operator visualization of the scanned volume. In one embodiment, the graphical display is integrated onto the scanner device. The term emission as used herein refers to any sort of energy or particles that emerge from an object under observation. It is understood that the emitted quantity, such as light for example, may originate from a separate source and be re-radiated by the object in the form of reflected or scattered emissions (for example, reflected visible light). The sensed emissions may include environmental emissions measurable with a noncontact sensor such as visible, infrared, and ultraviolet light, terahertz waves, millimeter waves, x-rays, and radioactive emissions such as alpha, beta, and gamma rays. The sensed emissions may be acquired by a sensing device that includes an image intensifier for assisting in capturing emissions at night—for example, of people or objects. Embodiments of the invention provide advantages in allowing the operator to view multiple data sets of the different types of collected emissions simultaneously on a three-dimensional (3D) image of the scanned volume.

In an embodiment, the laser scanner, as described herein and shown in the figures, outputs a 3D scanned image to a user interface screen located on or integral with the laser scanner. In one embodiment, the laser scanner includes a display such as is described in commonly owned U.S. patent application Ser. No. 13/197,404 which is incorporated by reference herein in its entirety. The scanned image may be displayed in a planar view, a panoramic view or a 3D view. In each type of view, the image is presented on a flat screen, but the perspectives and distortions of the displayed image are different in each case. For most types of scanners, the data is in the form of two angles and a radial distance, such as a spherical coordinate system for example. In the simplest type of view, the planar display, the data is simply reformatted into a rectangular region. In a planar view, straight lines in the physical world may appear as curves. A planar view is inherently a flat view so that it is not possible to rotate a planar image to obtain different views of an object.

In a panoramic view, objects in the measurement volume are mapped onto a geometrical shape such as a sphere, a cube or a cylinder, thereby removing distortions seen in the planar view. In a panoramic view, a user can turn the view but cannot leave the center of the view. In a 3D view, such as that shown in FIGS. 6-8 for example, a user can leave the center of the view and observe an undistorted 3D image from any desired location and orientation. A 3D view may even allow a user to travel through the 3D image of the measured volume, thereby enabling the user to view the measured volume from a variety of viewing points.

The planar, panoramic and 3D views described above may be contrasted to a digital image captured by a camera, or parameters acquired by a parameter image sensor. As used herein, the images acquired by a camera refers to a two-dimensional (2D) image.

Each of these views: planar, panoramic and 3D, may be presented on a monitor in a full or reduced format. The view may appear in a reduced format (e.g., every nth pixel is displayed) to give the user a quick manner of determining if the desired elements have been recorded. In addition, each of these types of view may be displayed individually as a single view or several views may be displayed together at the same time. In some cases, multiple sets of scan data may be combined through the use of registration techniques to provide a larger view of the measured volume in a single image representation.

Referring now to FIGS. 1-4, a laser scanner 20 is shown for optically scanning and measuring the environment surrounding the laser scanner 20. As used herein, the term environment refers to all surfaces and objects within a region of space that are accessible for scanning by the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about a vertical axis 23 and a horizontal axis 25. The measuring head 22 has a rotary mirror 26, which may be rotated about the horizontal axis 25. The rotation about the vertical axis may be about the center of the base 24.

The measuring head 22 is further provided with an electromagnetic radiation emitter, such as light emitter 28 for example, that emits an emitted light beam 30. In one embodiment, the emitted light beam 30 is a coherent light such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto the rotary mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axis 25 and 23, respectively. These angular positions in turn depend on the corresponding rotary drives that each includes at least one encoder 134, 136.

Coupled to the light emitter 28 and the light receiver 36 is a controller 38. The controller 38 determines, for a multitude of measuring points X, a corresponding number of distances d between the laser scanner 20 and points X on object 34. The distance to a particular point X is determined based at least in part on the speed of light in air through which electromagnetic radiation propagates from the device to the object point X. In one embodiment the phase shift between the laser scanner 20 and the point X is determined and evaluated to obtain a measured distance d.

The measuring head 22 includes a distance meter 39 that measures distance from the scanner to points on surfaces being measured. The distance meter 39 includes the light receiver 36 and the controller 38, wherein the controller may in addition be used for other scanner functions.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight of the light in the air (the round-trip time for the light to travel from the device to the object and back to the device). A method of measuring distance based on the time-of-flight of light (or any type of electromagnetic radiation) depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined using one known side length and two known angles of a triangle. The method of triangulation, therefore, does not directly depend on the speed of light in air.

The scanning of the volume about the laser scanner 20 takes place by quickly rotating the rotary mirror 26 about axis 25 while slowly rotating the measuring head 22 about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received optical power. The gray-scale value may be determined, for example, by integration of the bandpass-filtered and amplified signal in the light receiver 36 over a measuring period attributed to the object point X.

Figure 5:
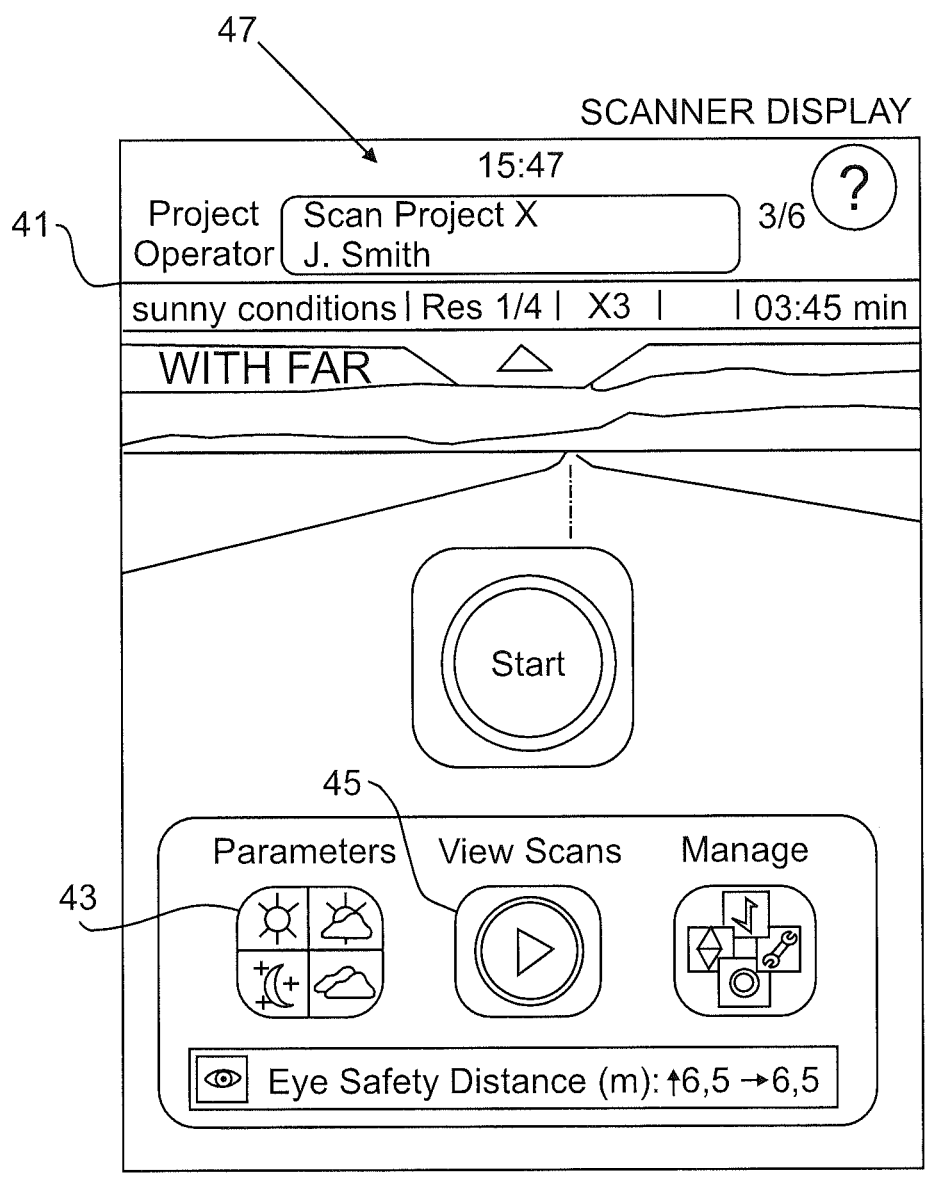
FIG. 5 is an illustration of a user interface screen for the laser scanner of FIG. 1 that includes a touch screen that is utilized by the operator in accordance with an embodiment of the invention.

The measuring head 22 may include a display device 40 integrated into the laser scanner 20. The display device 40 may include a graphical touch screen 41, as shown in FIG. 5, which allows the operator to set the parameters or initiate the operation of the laser scanner 20. For example, the screen 41 may have icons, such as a parameters icon 43 that allows the operator to change the scanning variables. The screen 41 may further have a "view scans" icon 45 as will be discussed in more detail below. The screen 41 may further include a portion 47 that provides the operator with additional information such as the name of the project, the operator logged into the device, ambient temperature and time for example. It should be appreciated that having an integrated display device 40 provides advantages in allowing the operator to perform all of the operations for acquiring data and viewing the scanned image without having to transport and connect additional equipment, such as a laptop computer for example.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. The shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 42 adjacent the base 24. The arm portion for each yoke 54, 56 extend from the traverse 44 obliquely to an outer corner of the respective shell 50, 54. From the outer corner of the shell 50, 54, the yokes 54, 56 extend along the side edge of the shell 32 to an opposite outer corner of the shell 50, 54. Each yoke 54, 56 further include a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 52 and the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36 for example, the measured distances d depend on signal intensity, such as brightness, temperature for example. A distance correction, which is stored as a function of brightness is nonlinear, is there used. Since the prism 60 is a known distance, and known brightness levels, an adjustment of the distance correction may be performed during operation when the emitted light beam 30 strikes the prism 60 and is reflected back. This allows for the compensation of environmental variables such as temperature. In the exemplary embodiment, the adjustment of the distance correction is performed by the controller 38.

The base 24 is coupled to a swivel assembly (not shown) such as that described in commonly owned PCT Application Serial No. PCT/EP2011/003263, which is incorporated herein in its entirety. The swivel assembly is housed within the carrying structure 42 and includes a motor that is configured to rotate the measuring head 22 about the axis 23. The laser scanner 20 may further include vent openings that allow air flow through the laser scanner to protect prevent undesirable temperature levels within the laser scanner 20 to protect internal components.

In some applications, it may be desirable to obtain additional information about the scanned volume in addition to the 3D coordinates and gray-scale values of the data points. In the exemplary embodiment, the laser scanner 20 includes a first image acquisition device 64 and a sensing device 66. The image acquisition device 64 and the sensing device 66 are in asynchronous and bidirectional communication with the controller 38.

In the exemplary embodiment, the first image acquisition device 64 is a camera. The camera may be a color camera having a sensor, such as a CCD or a CMOS sensor. The sensor provides a signal which is three-dimensional in color space, such as an RGB signal for example, for a two-dimensional image 68 in real space. The center 70 of the first image acquisition device 64 is taken as the point from which the color image 68 is taken, such as the center of the aperture for example. Alternatively, the camera may be a monochrome camera or a camera that measures infrared or ultraviolet wavelengths.

A sensing device 66 may be a device that captures and measures a parameter associated with the scanned volume or the scanned object and provides a signal representing the measured parameters over image acquisition area 72. The sensing device 66 may be capable of acquiring optical emissions outside the visible range—for example, in the infrared and ultraviolet regions. In these regions, optical components such as lenses and beam splitters may be used. In addition, the sensing device may be capable of measuring millimeter waves, terahertz waves, and x-rays. The sensing device 66 may be a radiation detector having the ability to measure at least one of alpha radiation, beta radiation, and gamma radiation. The sensing device 66 may include an image intensifier used in combination with another sensor to provide brighter images in dark surroundings. In some embodiments, the sensing device 66 includes a single sensor element, while in other embodiments the sensing devices includes an array of sensing elements, that is to say an array detector. In some embodiments, a conditioning element may be provided as a part of the sensing device 66 to condition in incoming emissions. For example, for the case of an optical sensing device 66, the conditioning device may include a lens 74 to provide on the array detector an image of the emissions at the position of the surfaces being measured. In another instance, for example, in the case of an x-ray array detector, the conditioning device may be a pinhole plate 74, designed to serve a function similar to that of a pinhole plate in a pinhole camera. In the case of an x-ray array detector, the material of the pinhole plate 74 may be a dense material such as lead.

In some embodiments, the first image acquisition device captures and measures a parameter associated with the scanned volume. In one embodiment, the parameter acquired by the first image acquisition device is different from the one acquired by the sensing device. For example, the first image acquisition device may be an ionizing radiation detector and the sensing device may be a thermal imager.

For exemplary purposes, the embodiments described herein will be in reference to a thermal imager that uses the infrared range of the electromagnetic spectrum to produce images of radiation emitted by objects within the scanned volume. However, this is for exemplary purposes and the claimed invention should not be so limited.

The image acquisition device 64 and the sensing device 66 are mounted to the measuring head 22 by a holder or bracket 76. The brackets 76 fix the devices 64, 66 to the measuring head so that the devices 64, 66 may be rotated about the axis 23. In this manner, the devices 64, 66 may acquire several images 68, 72 as the measuring head 22 is rotated about the axis 23 to thus cover the entire angular range. The direction from which the images 68, 72 are taken may be registered by encoders. In one embodiment, the bracket includes a mechanism for relating the attached device.

It should be appreciated that being able to displace scan image data and acquired parameters on a user interface of the laser scanner provides advantages in providing the operator the ability to verify that the scan data has been correctly captured and is complete. Further, by being able to display the measured points, the image and the acquired parameters simultaneous over all or a portion of the user interface allows that operator to visualize the acquired parameters quickly to ascertain the condition of the scanned volume.

In one mode of operation, the color image and acquired parameters are displayed simultaneously with the scan data. In a second mode of operation, one, two, or three of color image, acquired parameters, and scan data are displayed in a partial transparency mode, thereby enabling all the data to be viewed without any one type of data obscuring the other types of data. In a third mode of operation, selected portions of the color image, acquired parameters, and scanned data are displayed.

In an embodiment, only a portion of the acquired parameters are displayed. For example, measured radiation levels may be displayed when the levels exceed a given threshold. As another example, collected infrared data may be used to identify the movement of people, with the visual display configured to indicate the amount of movement. Such a display might be used, for example, in a measurement made at night when light levels are too low to detect human presence by means of visible light. During a three-dimensional measurement by a scanner, an infrared camera may be used to measure the temperature of objects and to note changes in object temperatures, thereby enabling detection of human movements. The presence of human movements may then be overlaid on the scanned images.

Figure 6:
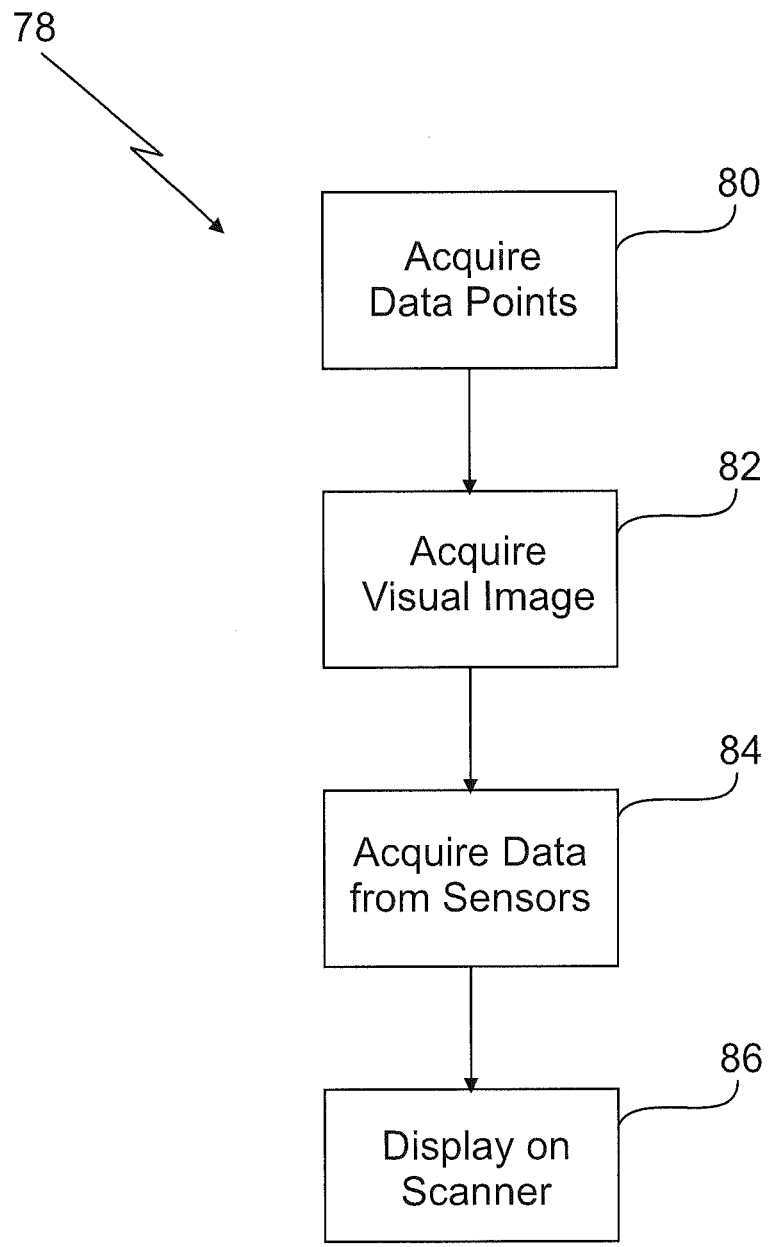
FIG. 6 is a flow chart illustration of a process for measuring a volume and acquiring environmental parameters of a volume of space with a laser scanner in accordance with an embodiment of the invention.

FIG. 6 illustrates a process flow 78 for displaying scan data, visual images and acquired data on a user interface 41 on a laser scanner 20. First, the process 78 acquires the measured data points X at block 80. In some embodiments, the process of acquiring the data points includes having the operator select a volume of space to be scanned. In an embodiment, the operator may be able to select at least one object of interest for scanning. In another embodiment, the laser scanner is set up to include objects within at least one geographical location. In an embodiment, the laser scanner is set up to include objects within a region of space. In an embodiment, the operator may, before the scan is initiated, inspect and set parameters by selecting the "parameters" icon on the user interface 41. These parameters include, but are not limited to: scan area, resolution, scan quality, filter settings, color or black and white scan. The user interface may provide selections for including the types of data points and images to be collected. For example, the user may select to include 2D photographs, infrared scan images, radiation images, and other types of sensor data in addition to scan data. The user interface may also provide selections for how data is to be displayed—for example, in multiple windows displayed simultaneously; arranged with some images displayed in a solid or semi-transparent mode on top of other images; or with an overlay of images over a portion of the scan data.

The user interface may also enable the user to embed abstract features into the display. Such features computed graphical elements, such as lines, curves, or other computed images (e.g. edges), text or other labels, and abstract images based on measured positions—for example, survey points. Such abstract features may be downloaded from an internal or external computer or storage device into the displayed images or may be calculated by the controller 38.

The steps in the blocks 80, 82, and 84 are illustrated in FIG. 6 in this sequence for exemplary purposes and the claimed invention should not be so limited. The steps illustrated in blocks 80, 82, and 84 may be performed in any order and are not limited to the order shown in FIG. 6. At block 80, the laser scanner receives data points that include, but are not limited to: distance information, gray-scale values for each measurement value, vertical angle information and horizontal angle information. The distance measurement value, vertical angle information and horizontal angle information are collectively referred to herein as 3D coordinates. The distance and angle measurements can be used to convert 3D coordinates obtained in the local scanner coordinate system into any other desired coordinate system, such as a Cartesian or cylindrical coordinate system for example.

Figure 2:
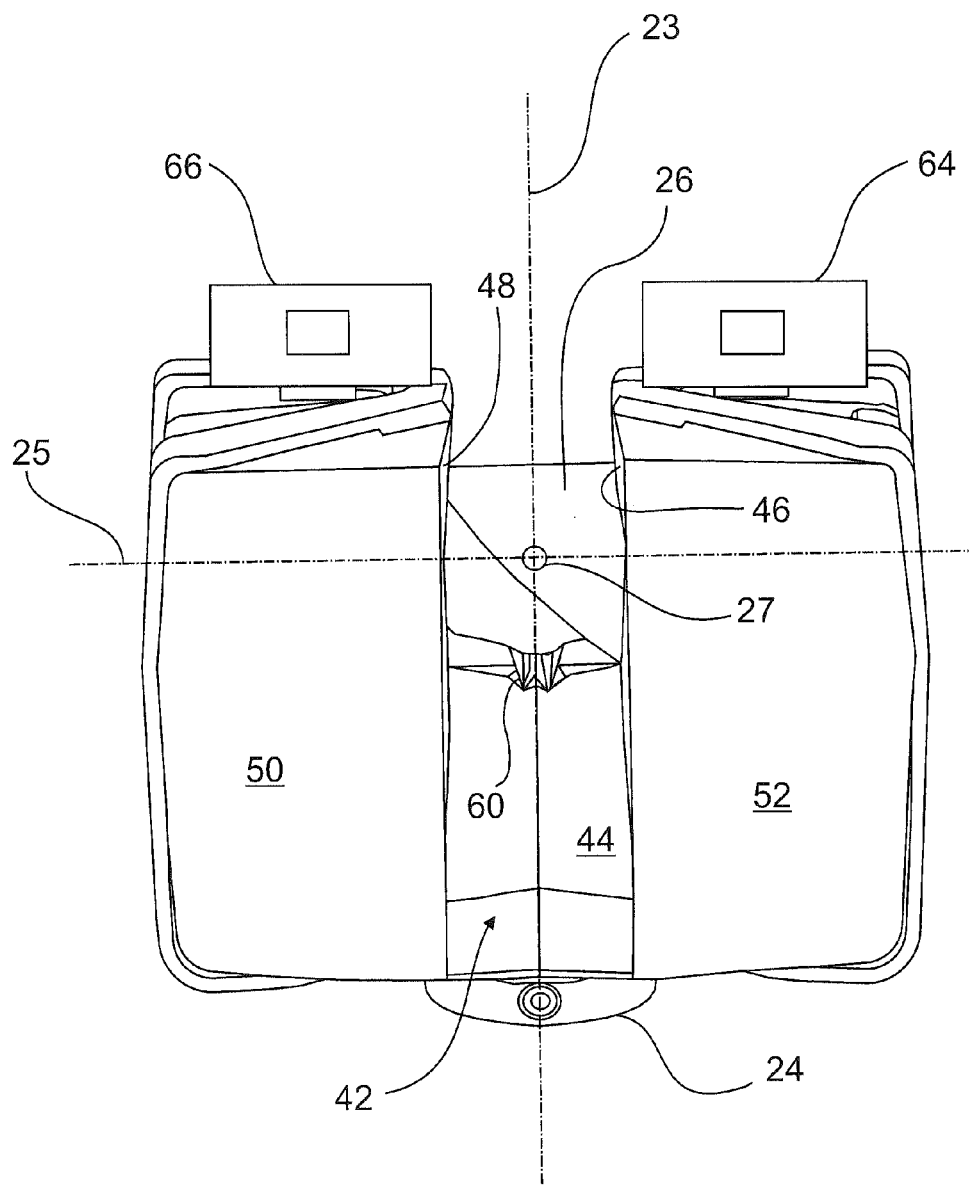
FIG. 2 is a side perspective view of the laser scanner of FIG. 1.
Figure 3:
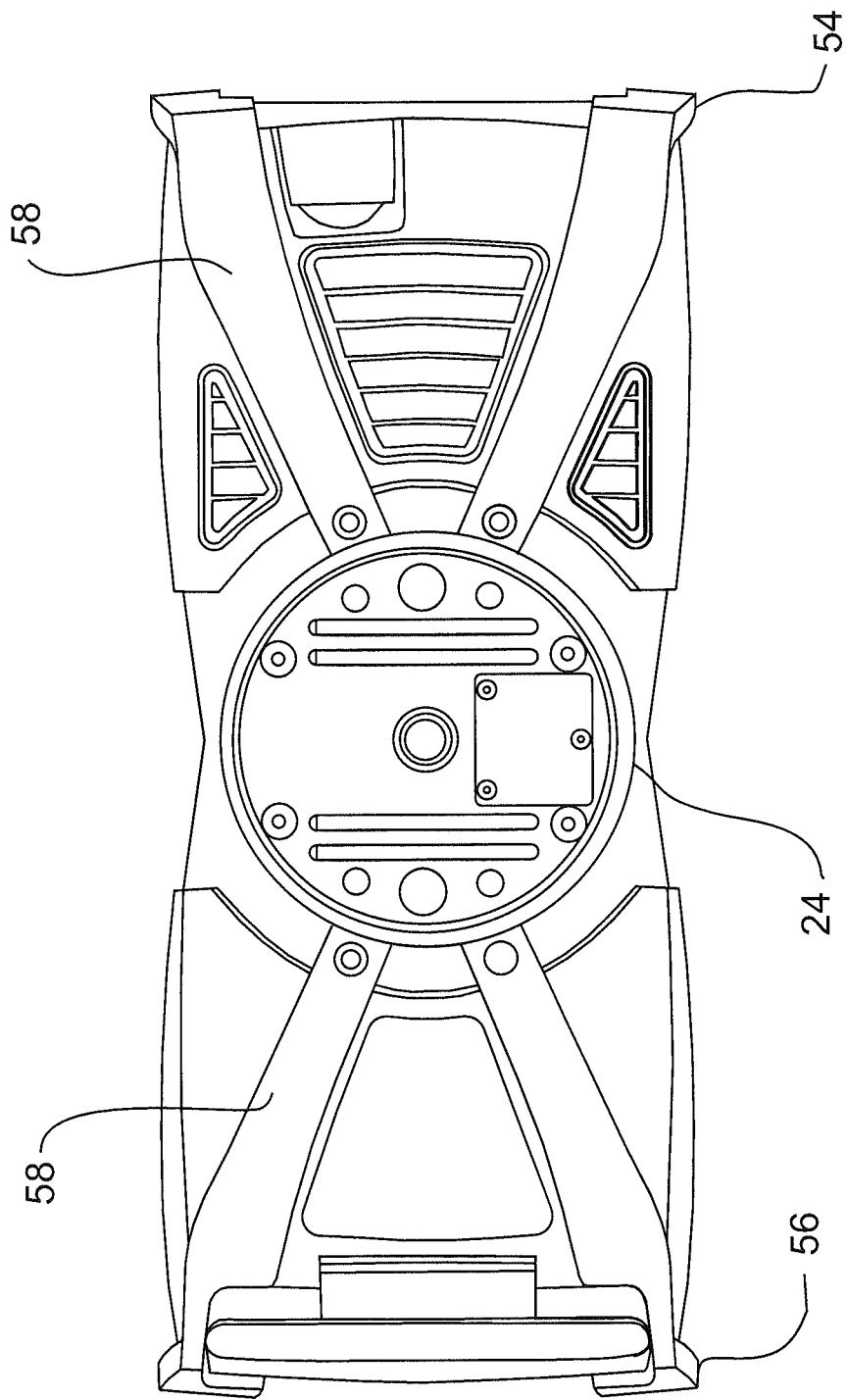
FIG. 3 is a bottom view of the laser scanner of FIG. 1.
Figure 4:
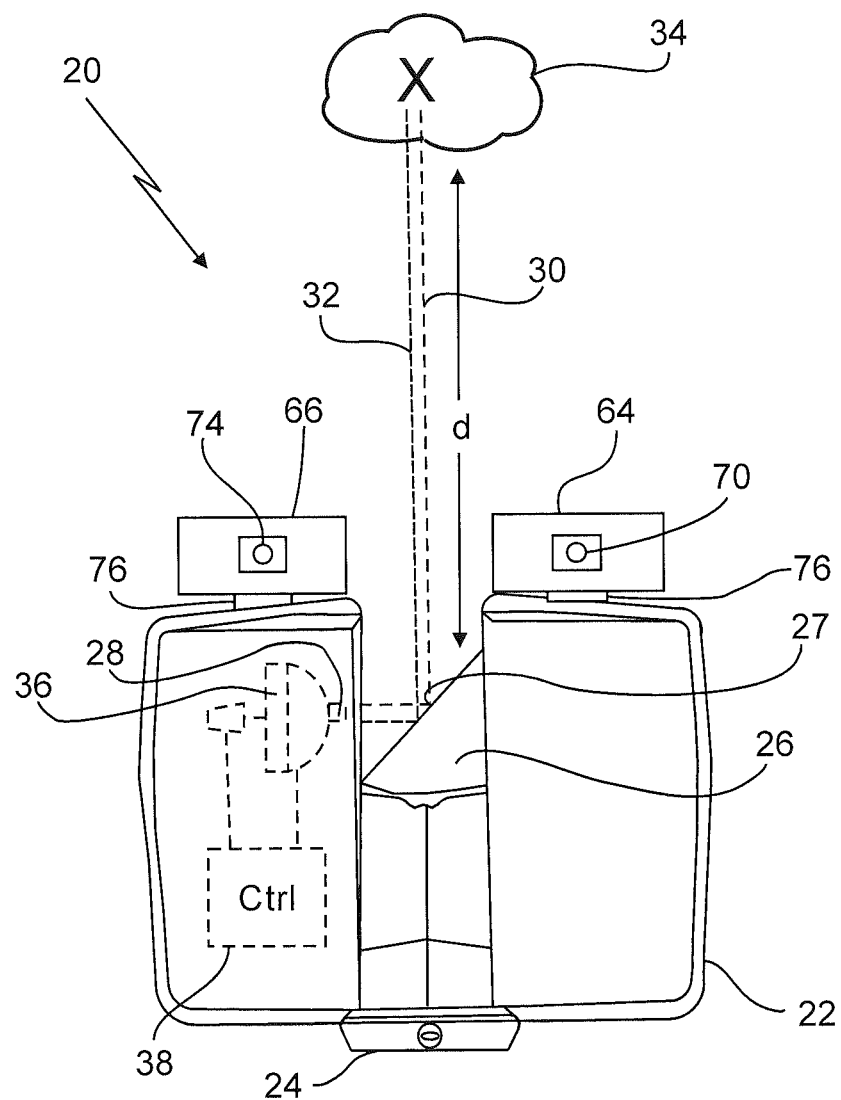
FIG. 4 is a schematic illustration of the laser scanner of FIG. 1 that is optically scanning and measuring a volume.
Figure 11:
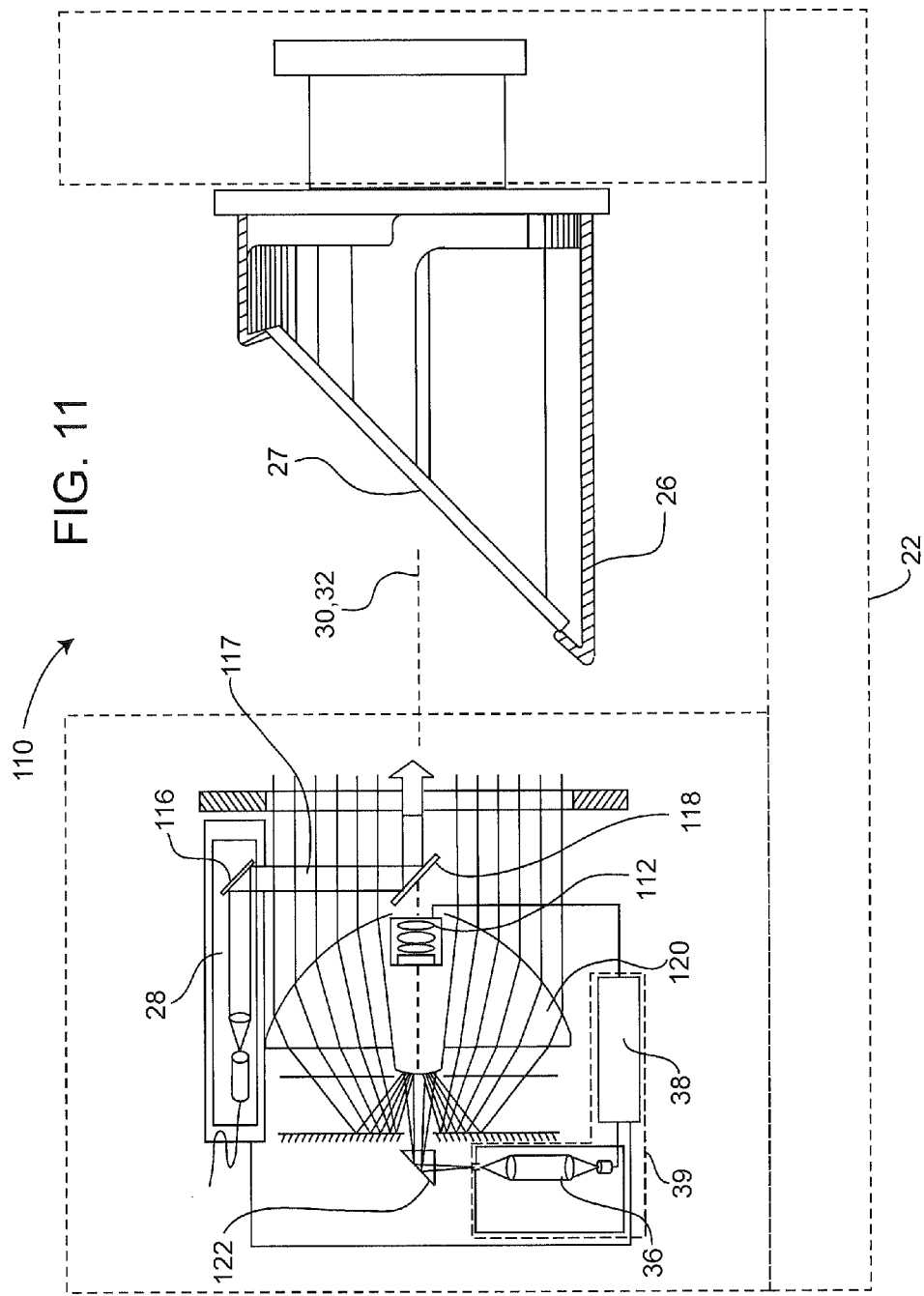
FIG. 11 is a schematic illustration of a laser scanner in accordance with another embodiment of the invention.
Figure 12:
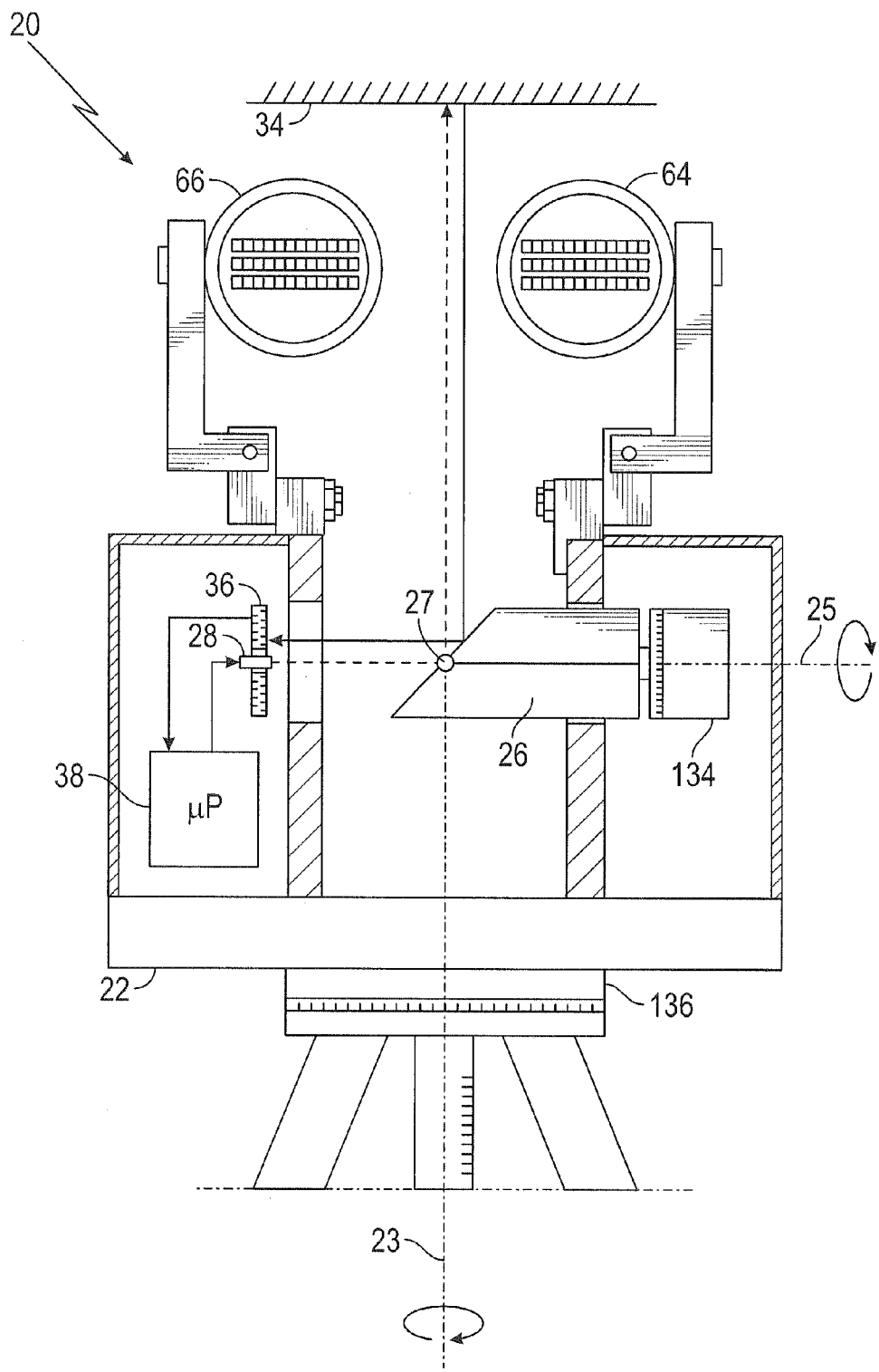
FIG. 12 is a schematic illustration of a laser scanner in accordance with another embodiment of the invention with the image acquisition devices in a first position.
Figure 13:
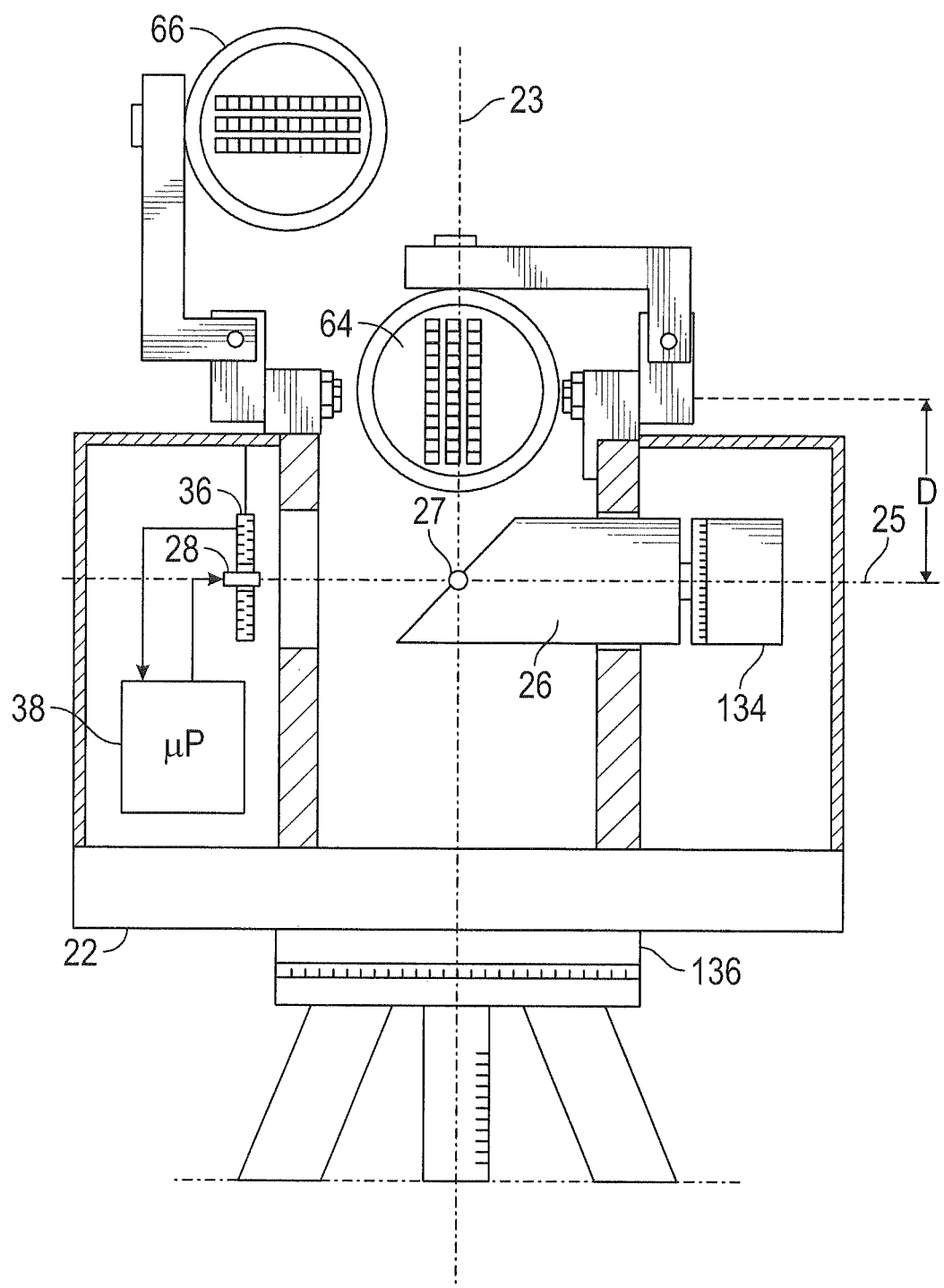
FIG. 13 is a schematic illustration of the laser scanner of FIG. 12 with one of the image acquisition devices in a second position.

In the block 82, 2D visual images are captured. In some embodiments, a digital camera 64 is used to capture the 2D images. In one embodiment, the digital camera 64 is attached to the body of the scanner as shown in FIG. 2. In another embodiment, the camera is located internally to the scanner and may have the same optical axis as the 3D scanner device. This embodiment is illustrated in FIG. 11. Such an approach has the advantage of reducing or minimizing parallax. In another embodiment, illustrated in FIGS. 12, 13, the camera is attached to the scanner body but provided with an adjustment mechanism that enables the camera optical axis to be aligned to the axis 23. The height the scanner on a stand that holds it may then be lowered or raised to bring the optical axis of the camera into approximate coincidence with the optical axis of the scanner prior to the adjustment. The digital camera takes 2D photographic images of the scanned area in order to capture color data to add to the scanned image. In the case of a built-in color camera having an optical axis coincident with that of the 3D scanning device as shown in FIG. 11, the direction of the camera view may be easily obtained by simply adjusting the steering mechanisms of the scanner—for example, by adjusting the azimuth angle about the axis 23 and by steering the mirror 26.

Whichever way the 2D digital color camera is aligned to the 3D scanner device, registration of 2D images with the 3D data scans may be improved by comparing features in 2D and 3D images. For example, lines, circles, and features of arbitrary type (including features appearing on registration targets) may be seen in both 2D and 3D data and used to adjust the position of the 2D images to the 3D scan data.

In the block 84, data is collected from sensors in addition to the 2D and 3D data obtained from the digital color camera and 3D scan mechanism described above. As used herein, the term "collected data" means a set of measured values acquired by a noncontact sensor associated with scanner 20 and coupled to communicate with the controller 38. In the exemplary embodiment, the collected data may be, but is not limited to: infrared wavelength data, millimeter wavelength data, x-ray wavelength data, gamma ray wavelength data, ionizing radiation or non-ionizing radiation for example. The sensing device (e.g. a thermal imaging device) captures 2D images of a collected data, such as temperature for example, of the scanned area. In one embodiment, a sensing device 66 is mounted directly to the body of the scanning device and may be rotate about the vertical axis 23. In another embodiment, the image acquisition may be internal to the scanner and may share a collection axis coincident with the axis of the 3D measuring system (similar to the arrangement shown in FIG. 11 but with a type of sensor different than or in addition to a 2D color camera). In another embodiment, the image acquisition device may be mounted externally but adjustable to minimize parallax.

It is also possible to collect sensor data on a point-by-point basis rather than as a collection of points in an image. For example, an image may be integrated into the scanner in such a manner that the desired sensor data is collected a point at a time in conjunction with the collected 3D data. An advantage of this embodiment is that sensor data may be automatically registered with the 3D scan data.

As stated above, it should be appreciated that while the process 78 described the capturing of images or data by devices (such as the devices 64, 66) as being sequential, this is for exemplary purposes and the claimed invention should not be so limited. In one embodiment, the devices 64, 66 capture images simultaneously. In another embodiment, the images are captured simultaneously with the acquisition of the measured data points.

Figure 7:
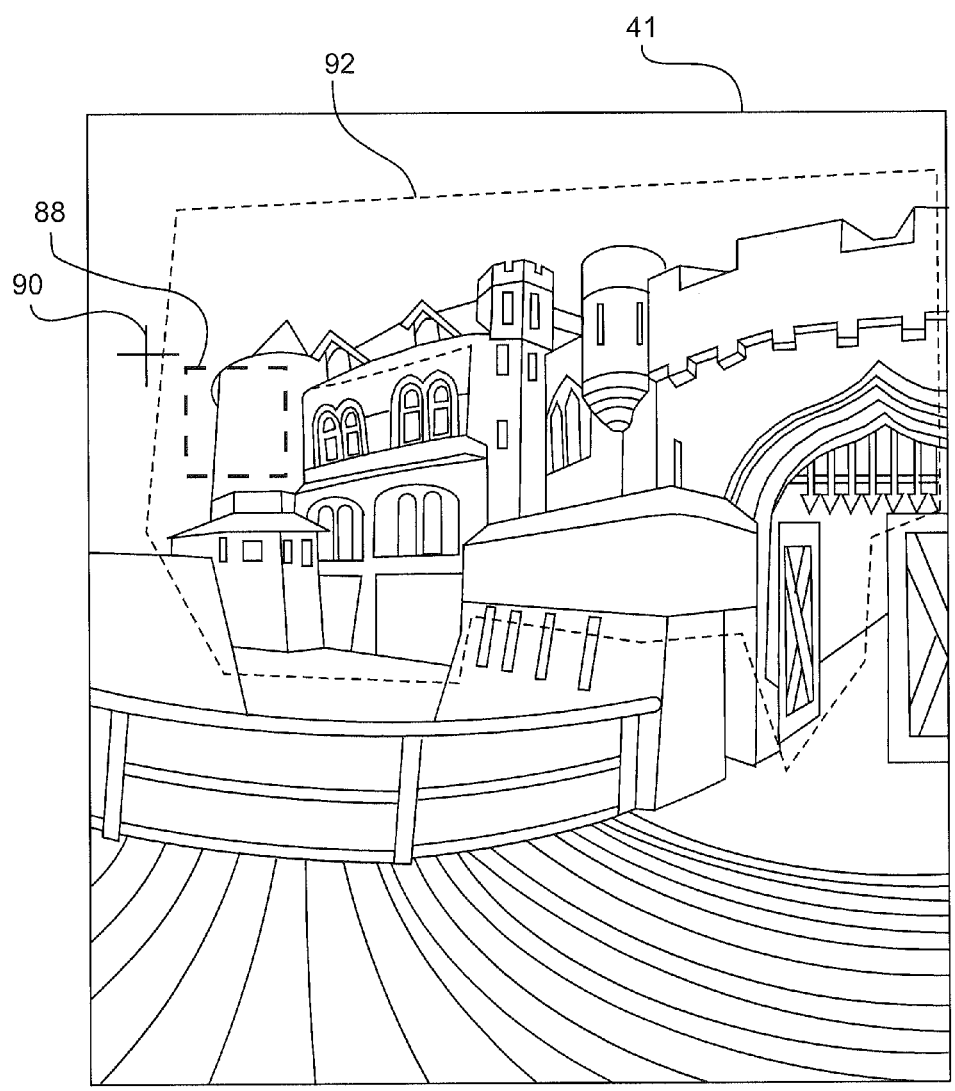
FIG. 7 is an illustration of the user interface screen of FIG. 5 with a view of a three-dimensional scanned image in accordance with an embodiment of the invention.

The process 78 then proceeds to block 86 where the scanned measured points are translated into a viewable image and displayed on the user interface 41, such as a gray-scale image, a 3D image, a color-enhanced 3D image, or a line image as is shown in FIG. 7 for example. In some embodiments, color or sensor images may be automatically displayed. In other embodiments of the invention, the operator has user selectable options for displaying the measured points, the photographic images and the sensor images. In one embodiment, the operator may select a collected data area 88 on the user interface 41 using a selection tool 90. The collected data area 88 defines the area that the operator desires to view collected data values. In another embodiment, the operator may select a range of collected data values (e.g. temperatures greater than 100° F. or between 80° F. and 100° F.) to define which collected data values are graphically displayed. The operator may further select a second or image area 92 using the selection tool 90. The image area 92 defines the objects which will be displayed in color.

Once the operator selects the areas 88, 92, the laser scanner 20 translates or maps the color information from the photographic images onto the measured points within the area 92. Mapping is a process of linking the scan data for the measuring points X (3D real space) with the images from camera 64 (visual color). The deviation of the center 70 from the laser scanner center C may be corrected. Linking is performed for each image of the color camera 64 to each measured point X. Thus each measured point X receives assigned color values. In the exemplary embodiment, the mapping of the color image and the measured points X is performed by projecting onto a common reference surface, such as a sphere for example. The projection of the colored image onto the reference surface.

Similarly, the images from the sensing device 66 may be mapped on to each measured point X by projecting onto the common reference surface. The mapping process may be an iterative method that wherein the transformed virtual position of the acquired images may be shifted to new virtual positions until the acquired images and the scanned image obtain the best possible compliance between the measuring points X and the images from the acquisition device 64 and the sensing device 66.

Figure 8:
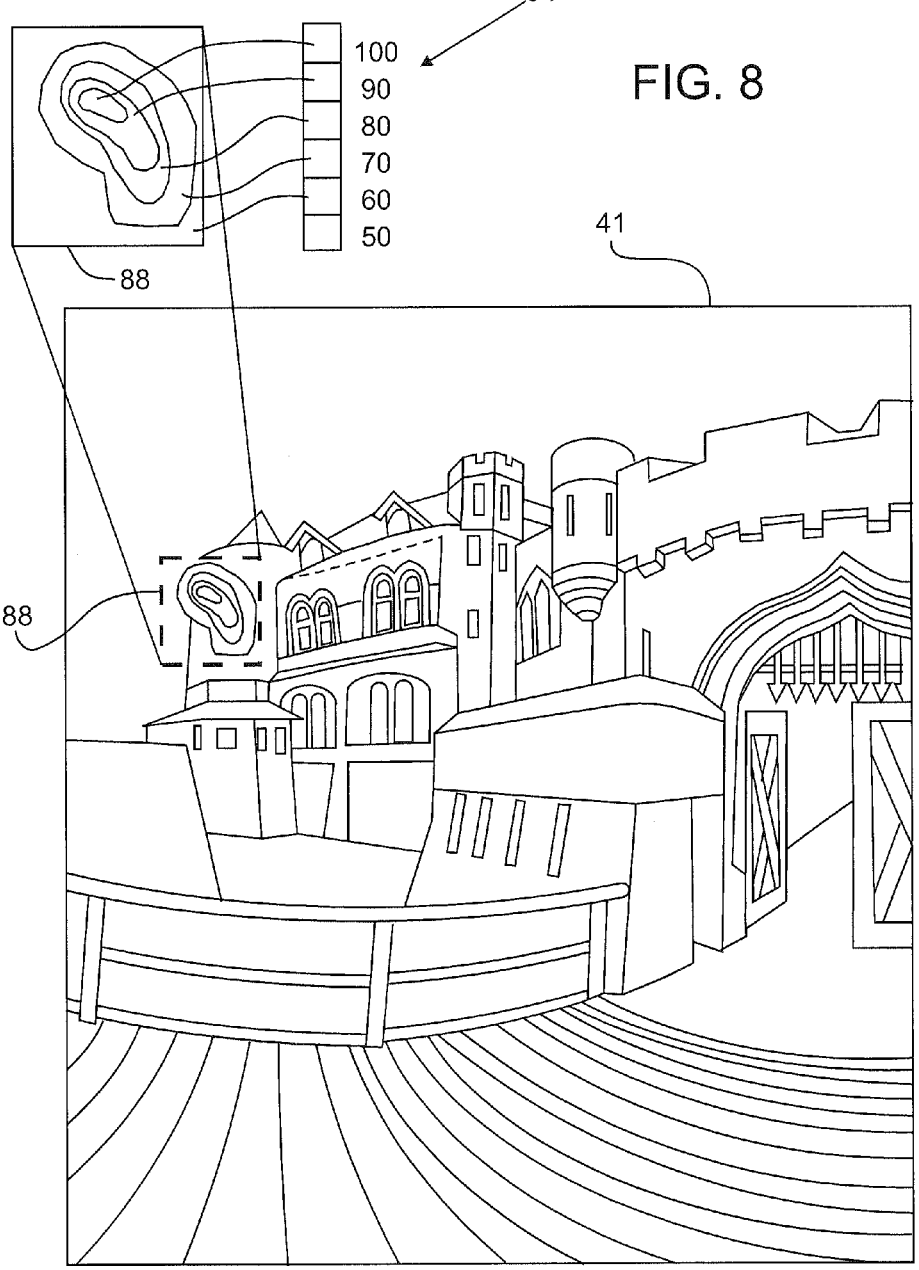
FIG. 8, including

FIG. 8 illustrates an exemplary user interface 41 having a simultaneous display of the scanned image, a colorized scanned image and a sensor collected data value overlay. It should be appreciated that the sensor collected data values may be displayed on the user interface 41 in a variety of ways, such as the contour plot shown in FIG. 8 for example. In this embodiment, the user interface 41 may include a range key 94 (FIG. 8A) that maps the values to a color. In another embodiment, the sensor collected data values are mapped to all of the measured points and the operator may obtain values, such as temperature values for example, by moving the selection tool to locations on displayed image and the laser scanner 20 displays a numerical value for the sensor reading at that location.

It should be appreciated that the user interface 41 may include further controls and functionality that allows the operator to inspect and navigate the image such as by scrolling, zooming in, zooming out, rotating and panning for example. In one embodiment, the operator may obtain measurement dimensional qualities via the user interface 41, such as with the selection tool 90. The images may be displayed in any of several forms, such as but not limited to: immediately after the scan operation, during the scan operation up to a latest record, in gray tone, in color tones, a 2D image with mapping of the sphere to a flat 2D area, as a panoramic image, as a 3D image, in a perspective view or in an isometric view.

Other operator options may include, but are not limited to: changing scan parameter, starting the next scan selecting an area of the image to set the angular limits for the next scan. In still further embodiments, the scanned data may be combined with a previous scan data set where the scans are registered to a common coordinate system. The registration is usually done by using reference points, such as natural or artificial targets, that are common in overlapping areas of scans. In an embodiment, the user interface 41 also allows additional information (e.g., a compass, the GPS coordinates), allows selected parts of the measured points to be displayed, allows slices of the measured points to be displayed, and allows a transparent view of the measured points.

In an embodiment, the laser scanner 20 is connected to one or more remote computer processors, such as through a wired or wireless wide-area-network (WAN) for example, to deliver and store recorded data, to process the data (filtering, registration, object recognition, etc.) and to send data back to the laser scanner 20 or to stream visual data to the scanner display. In one embodiment, the laser scanner 20 in connected with a battle management system or similar security management system that allows for bidirectional communication of the 3D images with ground or airborne personnel.

Figure 9:
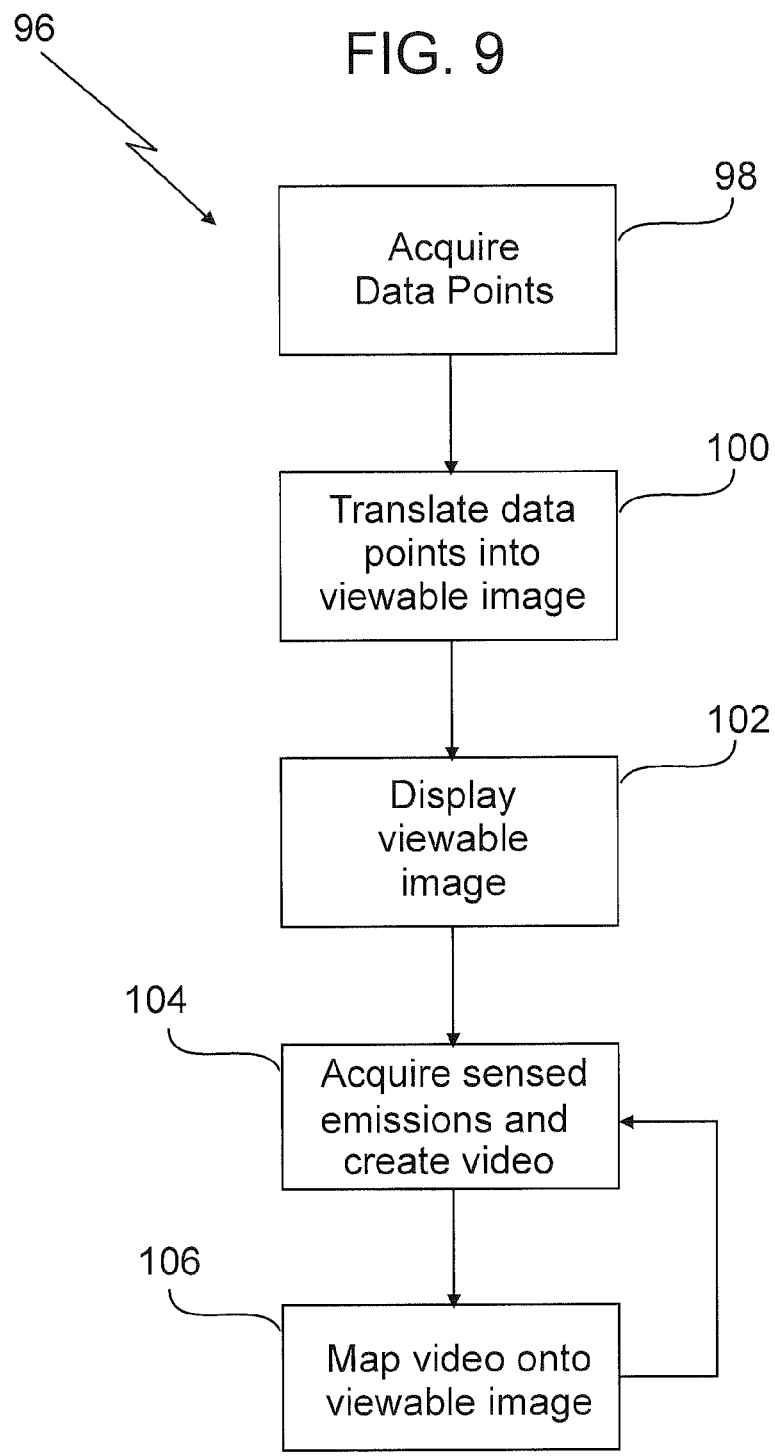
FIG. 9 is a flow chart illustration of a process for measuring a volume and acquiring parameters and a video image of a volume of space with a laser scanner in accordance with another embodiment of the invention.
Figure 10:
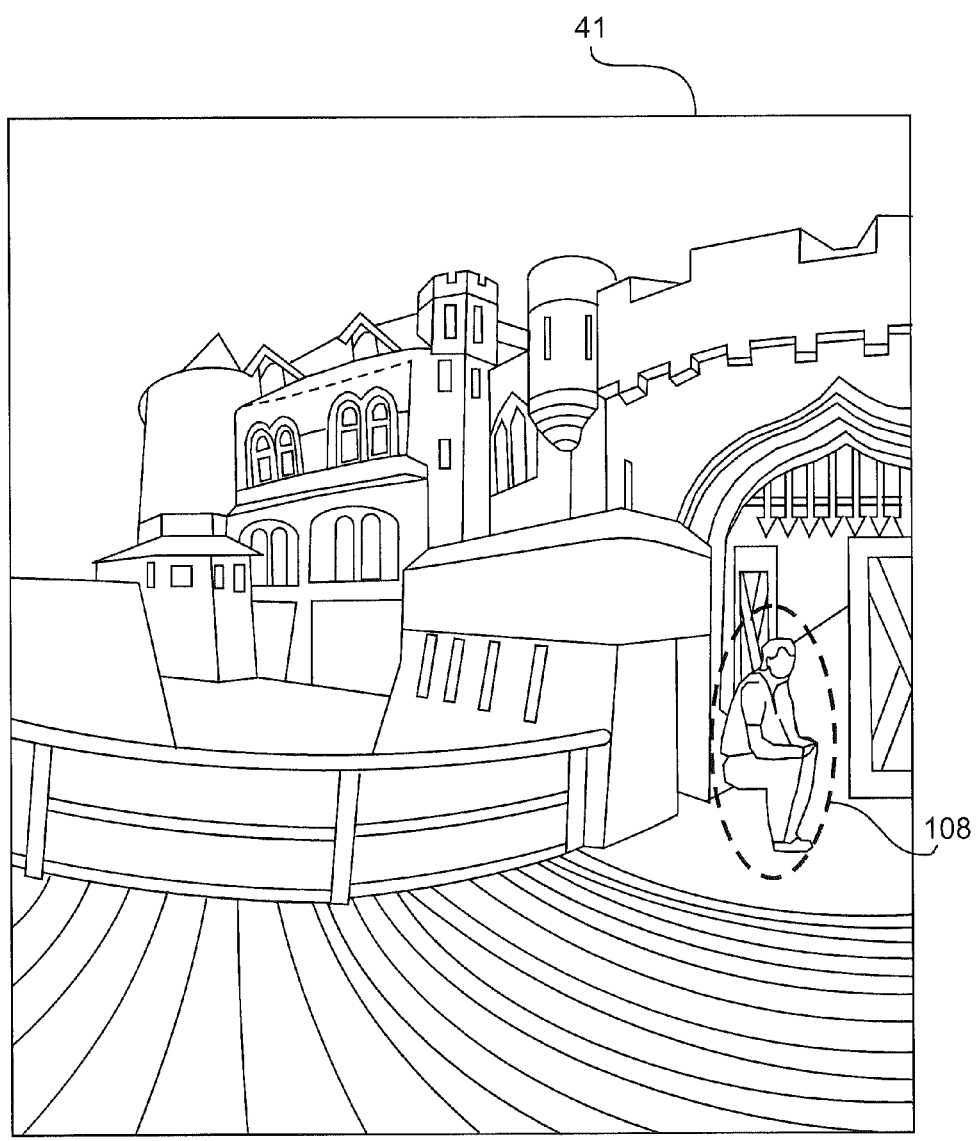
FIG. 10 is an illustration of the user interface screen of FIG. 5 with a video image overlay of an area of interest.

FIG. 9 illustrates another process flow 96 for integrating video images of collected data obtained from sensors onto user interface 41. In this embodiment, the sensing device 66 captures video images of an area of interest. The process 96 starts in block 98 acquiring the measured data points X for the scanned volume or a user selected area of interest as described herein above. The process 96 then translates the measured points into a viewable image in block 100 and displays the image on the user interface 41 in block 102. The laser scanner 20 then initiates the sensing device 66 to acquire a video image of the collected data in block 104. In the exemplary embodiment, the sensing device 66 captures infrared or near infrared electromagnetic radiation. The laser scanner 20 maps the video stream in block 106 from the sensing device 66 and overlays the video image on the image of the measured points on user interface 41 as shown in FIG. 10. In one embodiment, the user interface 41 allows the operator to designate an area of interest 108 and track the movement or change in that area while maintaining a simultaneous display of the 3D image of the scanned measured points. It should be appreciated that this provides advantages in applications such as monitoring a manufacturing process, at a disaster location, in homeland security or law enforcement surveillance, or in military operations.

Referring now to FIG. 11, another embodiment of a laser scanner 110 in accordance with another embodiment of the invention. In this embodiment, the image acquisition devices 112, 114 may be integrated into the measuring head 22 and arranged to acquire images along the same optical pathway as emitted light beam 30 and reflected light beam 32. In this embodiment, the light emitter 28 is reflected off a fixed mirror 116, travels to dichroic beam-splitter 118 that reflects the light 117 from the light emitter 28 onto the rotary mirror 26. The dichroic beam-splitter 118 allows light at wavelengths at wavelengths different than the wavelength of light 117 to pass through. For example, the light emitter 28 may be a near infrared laser light (for example, light at wavelengths of 780 nm or 1150 nm), with the dichroic beam-splitter 118 configured to reflect the infrared laser light while allowing visible light (e.g. wavelengths of 400 to 700 nm) to transmit through. In other embodiments, the determination of whether the light passes through the beam-splitter 118 or is reflected depends on the polarization of the light.

One or more image acquisition devices 112, 114 are positioned adjacent the emission mirror 118 opposite the rotary mirror 26. In one embodiment, the first image acquisition device 112 is a camera that captures photographic images and the sensing device 114 is a device that captures images of a collected data, such as a thermal imager. In other embodiments, the sensing device 112 may be a device acquires a collected data such as but not limited to infrared wavelength parameter, an x-ray wavelength data, a millimeter wavelength data, an ultraviolet wavelength data, a gamma ray data, a non-ionizing radiation data, and an ionizing radiation data. It should be appreciated that while the embodiment herein describes both the first image acquisition device 112 and the sensing device 114 as both being arranged within the measuring head 22, this is for exemplary purposes and the claimed invention should not be so limited. In other embodiments, one of the acquisition devices, such as the camera for example, may be positioned within the measuring head 22 while the other device is coupled externally as described elsewhere herein. The acquisition devices 112, 114 may be coupled to or arranged within a recess in the collimator lens 120. The collimator lens 120 redirects the reflected light 132 and toward the light receiver 36 via mirror 122.

It should be appreciated that arranging the acquisition devices 112, 114 within the measuring head 22 and aligned with the axis 25 provides advantages in that there is virtually no parallax between the scanned data and the acquired images. In some embodiments, further advantages may be gained by simultaneously capturing the scanned data and the images simultaneously. In another embodiment, the capturing of scanner data and the image data is performed sequentially, with the rotary mirror 26 being rotated at a lower speed (about 100 cycles per second) than when capturing scanner data (which might be 730 cps to 5280 cps, for example).

The technical effects and benefits include the ability to verify that scan data and acquired collected data have been captured correctly and that the scan is complete. This can lead to additional complete scans or smaller scans at higher resolution during a single scanning session. Further technical effects and benefits include the improved visualization of collected data, such as temperature for example, in the context of a 3D environment by the simultaneous display of the scan data, the visual images and the acquired collected data. Still further technical effects and benefits include allowing an operator to visualize changes in the position or values of a collected data in an area of interest using a video stream overlaid on a scan data.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "unit," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the laser scanner, partly on the laser scanner, as a stand-alone software package, partly on the laser scanner and partly a connected computer, partly on the laser scanner and partly on a remote computer or entirely on the remote computer or server. In the latter scenario, the remote computer may be connected to the laser scanner through any type of network, including a local area network (LAN) or a wide area network (WAN), or the connection may be made to an external laser scanner (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A laser scanner that measures three-dimensional (3D) coordinates of a surface comprising:
  a measuring head, a base, a light source, a first motor, a second motor, a first angle measuring device, a second angle measuring device, a rotary mirror, a distance meter, a sensing device, and a processor;
  the measuring head mounted on the base such that the measuring head is rotated about a vertical axis;

the light source attached to the measuring head and configured to launch a first light beam;

the first motor configured to rotate the measuring head about the vertical axis;

the second motor attached to the measuring head and configured to rotate the rotary mirror about a horizontal axis;

the first light beam deflected by the rotary mirror to a first direction, the first light beam intersecting the surface at a first point;

the first angle measuring device configured to measure a first angle of rotation about the vertical axis, the second angle measuring device configured to measure a second angle of rotation about the horizontal axis, the first direction determined by the first angle of rotation and the second angle of rotation;

the distance meter configured to receive the first light beam reflected off the first point and to determine a first distance from the scanner to the first point, the first distance based at least in part on a speed of light in air of the first light beam;

the sensing device attached to the measuring head the sensing device configured to capture a first emission from the first point, the sensing device a radiation detector, wherein the radiation detector is capable of measuring at least one of the group consisting of alpha radiation, beta radiation, and gamma radiation; and the processor configured to determine the 3D coordinates of the first point and to determine a value obtained from the sensing device corresponding to the first point, the 3D coordinates based at least in part on the first angle of rotation, the second angle of rotation, and the first distance, the processor further configured to associate the 3D coordinates of the first point and the value obtained from the sensing device.

2. The laser scanner of claim 1, wherein the sensing device is an x-ray array detector.

3. The laser scanner of claim 2, wherein the sensing device further comprises a lens.

4. The laser scanner of claim 2, wherein the sensing device further comprises a pinhole plate placed between the surface and the array detector.

5. The laser scanner of claim 1, further comprising a camera selected from the group consisting of a monochrome camera, a color camera, and a near infrared camera.

6. The laser scanner of claim 1, wherein the sensing device is further configured to capture the first emission from the first point by a reflection from the rotary mirror.

7. The laser scanner of claim 6, further comprising a dichroic beam-splitter between the sensing device and the rotary mirror.

8. The laser scanner of claim 1, wherein the processor is further configured to determine gray-scale information for the received first light reflected off the first point.

9. The laser scanner of claim 8, wherein the processor is further configured to associate the 3D coordinates of the first point with the gray-scale information.

10. The laser scanner of claim 4 wherein the pinhole plate is made from lead.

11. A method for measuring three-dimensional coordinates of a surface, comprising:

providing a laser scanner having a measuring head, a base, a light source, a first motor, a second motor, a first angle measuring device, a second angle measuring device, a rotary mirror, a distance meter, a sensing device, and a processor, the measuring head mounted on the base such that the measuring head is rotated about a vertical axis, the light source attached to the measuring head and configured to launch a first light beam, the first motor configured to rotate the measuring head about the vertical axis, the second motor attached to the measuring head and configured to rotate the rotary mirror about a horizontal axis, the first light beam deflected by the rotary mirror to a first direction, the first light beam intersecting the surface at a first point, the first angle measuring device configured to measure a first angle of rotation about the vertical axis, the second angle measuring device configured to measure a second angle of rotation about the horizontal axis, the first direction determined by the first angle of rotation and the second angle of rotation, the distance meter configured to receive the first light beam reflected off the first point and to measure a first distance from the scanner to the first point, the first distance based at least in part on a speed of light in air of the first light beam, the sensing device attached to the measuring head, the sensing device configured to capture a first emission from the first point, the sensing device is a radiation detector, wherein the radiation detector is capable of measuring at least one of the group consisting of alpha radiation, beta radiation, and gamma radiation;

directing the first light beam to the first point;

measuring the first distance, the first angle of rotation, and the second angle of rotation;

determining by the processor the three-dimensional coordinates of the first point based at least in part on the measured first distance, the measured first angle, and the measured second angle;

directing the laser scanner such that the sensing device is responsive to the first emission from the first point;

measuring a value for the first emission from the first point by the sensing device;

associating the measured value for the first emission with the three-dimensional coordinates of the first point; and storing the three-dimensional coordinates of the first point and the measured value for the first emission.

12. The method of claim 11 wherein, in the step of measuring the first distance, the first motor is rotated at a first constant angular velocity during the measuring.

13. The method of claim 11 wherein, in the step of measuring the first distance, the second motor is rotated at a second constant angular velocity during the measuring.

14. The method of claim 11 wherein, in the step of providing the laser scanner, the sensing device is further configured to capture the first emission from the first point by a reflection from the rotary mirror.

15. The method of claim 11, further comprising a step of determining gray-scale information for the received first light reflected off the first point.

16. The method of claim 11, further comprising a step of associating the three-dimensional coordinates of the first point with the gray-scale information for the received first light reflected off the first point.

17. The method of claim 11 further comprising providing a pinhole plate between the radiation detector and the first point.

18. The method of claim 17 further comprising transmitting the first emission is transmitted through the pinhole plate prior to being captured by the radiation detector.

19. The method of claim 18 wherein the pinhole plate is made from lead.

* * * * *